US00RE34801E

United States Patent [19]

Marshall et al.

[11] E Patent Number: Re. 34,801

[45] Reissued Date of Patent: Nov. 29, 1994

[54] ELECTROCHEMICAL GENERATION OF $N_2O_5$

[75] Inventors: Rodney J. Marshall; David J. Schiffrin, both of Southampton; Francis C. Walsh, Fareham; Greville E. G. Bagg, Waltham Abbey, all of England

[73] Assignee: The Secretary of State for Ministry of Defence in Her Britannic Majesty's Government of the United Kingdom of Great Britain and Northern Ireland, London, England

[21] Appl. No.: 102,727

[22] PCT Filed: Jun. 15, 1988

[86] PCT No.: PCT/GB88/00461

§ 371 Date: Jan. 29, 1990

§ 102(e) Date: Jan. 29, 1990

[87] PCT Pub. No.: WO88/10326

PCT Pub. Date: Dec. 29, 1988

Related U.S. Patent Documents

Reissue of:

[64] Patent No.: 5,120,408
Issued: Jun. 9, 1992
Appl. No.: 460,153
Filed: Jun. 15, 1988

[30] Foreign Application Priority Data

Jun. 17, 1987 [GB] United Kingdom ..... 8714156
Jun. 17, 1987 [GB] United Kingdom ..... 8714157

[51] Int. Cl.[5] ..... C25B 1/00

[52] U.S. Cl. ..... 204/101; 204/103; 204/129

[58] Field of Search ..... 204/101, 103, 129

[56] References Cited

U.S. PATENT DOCUMENTS 4,432,902 2/1984 McGuire et al. ..... 204/59 R
4,443,308 4/1984 Coon et al. ..... 204/101
4,525,252 6/1985 McGuire et al. ..... 204/101

*Primary Examiner*—Kathryn Gorgos
*Attorney, Agent, or Firm*—Nixon & Vanderhye

[57] ABSTRACT

A process is provided for the electrochemical generation of $N_2O_5$ in $HNO_3$, whereby a solution of $N_2O_4$ in $HNO_3$ is electrolyzed. An electrolytic cell for the electrolysis is also provided, having substantially parallel electrodes in electrode compartments separated by a cell membrane. The anode is of Pt, Nb, Nb/Ta 40:60 alloy with a Pt coating. The cathode is Pt, stainless steel, Nb, Nb/Ta 40:60 alloy. The cell membrane is preferably a perfluorinated cationic exchange membrane. In use $N_2O_5$ forms in the anolyte and $N_2O_4$ increases in the catholyte. A suitable design of cell and its use in a single- or multi-stage electrolysis process is also described.

14 Claims, 5 Drawing Sheets

Fig. 4
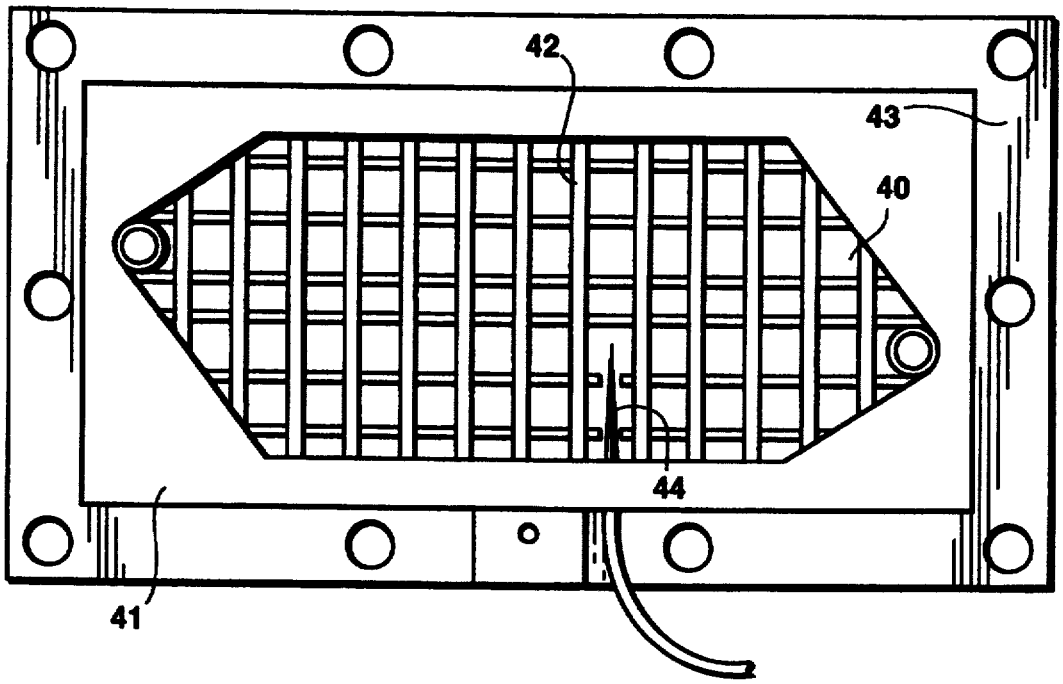
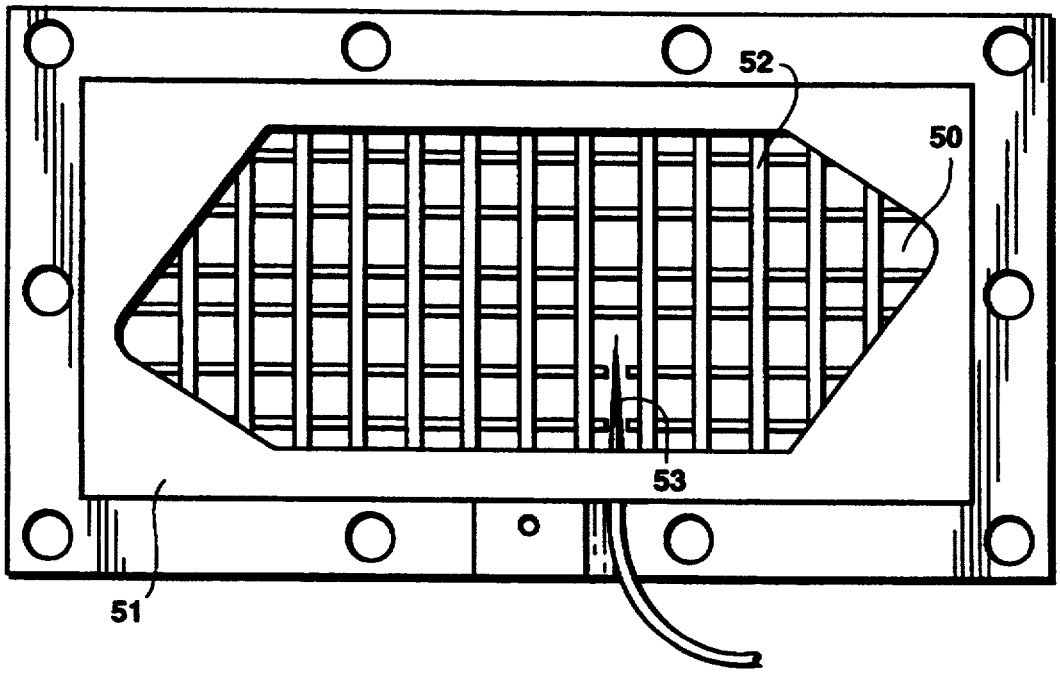
Fig. 5

ELECTROCHEMICAL GENERATION OF $N_2O_5$

Matter enclosed in heavy brackets [ ] appears in the original patent but forms no part of this reissue specification; matter printed in italics indicates the additions made by reissue.

The present invention relates to a method for the electrochemical generation of $N_2O_5$.

It has been reported (German Patent No: 231,546; J. Zawadski et al. Rocz. Chem., 1948, 22, 233) that $N_2O_5$ can be produced by electrolysis a solution of $N_2O_4$ in anhydrous nitric acid. The processes described in these reports are advantageous because they require no chemical dehydrating agents, such as poly-phosphoric acid. However, neither report suggested any advantage in controlling the reaction conditions during electrolysis.

J E Harrar et al, J Electrochem. Soc., 1983, 130, 108 described a modification of these early processes, which used controlled potential techniques. By maintaining a constant potential between the $HNO_3/NN_2O_4$ anolyte solution and the anode, the authors were able to improve current efficiency and thereby lower the cost of the electrochemical method. The authors have also described this modification in later U.S. Pat. Nos. 4,432,902 and 4,525,252.

The work of these authors, for the purpose of dehydrating $HNO_3$, was predated by UK Patent No: 18603 (H Pauling), which also described electrolysis as a means of dehydrating $HNO_3$.

The process described by Harrar et al, however, requires a sophisticated potentiostatic (constant anode potential) control and necessitates the use of a reference electrode.

It is one object of the present invention to provide a method for the electrosynthesis of $N_2O_5$ that avoids the need for potentiostatic control and a reference electrode.

Further objects and advantages of the present invention will become apparent from the following detailed description thereof.

According to the present invention there is provided a method for the electrochemical generation of $N_2O_5$ comprising providing an electrochemical cell having an anode plate situated in an anode compartment and a cathode plate situated in a cathode compartment, the anode plate and the cathode plate being in substantially parallel relationship, continuously passing a solution of $N_2O_4$ in $HNO_3$ through the anode compartment, continuously passing a solution of $N_2O_4$ in $HNO_3$ through the cathode compartment, whilst the $N_2O_4$ in the $HNO_3$ is passing through the anode and the cathode compartments, applying a potential difference between the anode and the cathode whereby electrical current is passed through the cell, and $N_2O_5$ is formed in the anode compartment, wherein the solution of $N_2O_4$ in $HNO_3$ is passed repeatedly through the anode compartment and either the potential difference between the anode and the cathode or the electrical current passing through the cell is maintained at a constant level.

By performing the present method at either a constant cell voltage (using a constant voltage generator) or a constant cell current (using a constant current generator), the need for potentiostatic control and a reference electrode is avoided.

The present process may be operated in either a continuous or a semi-continuous manner. In the former case the anolyte passed into the anode compartment contains, at all times, sufficient $N_2O_4$ to allow the use of a cell current high enough to maintain a high production rate and low power consumption. The retention of the $N_2O_4$ concentration at these levels may be effected, for example, by replacing the $N_2O_4$ electrolysed to $N_2O_5$ in the anode compartment.

By contrast, in a semi-continuous process there is no replacement of electrolysed $N_2O_4$ in the anolyte. This means that, as the $N_2O_4$ in the anolyte is converted to $N_2O_5$, the anolyte concentration of $N_2O_4$ will, if the electrolysis proceeds for long enough, fall to zero. In one embodiment of the semi-continuous process, the anolyte is repeatedly passed into and out of the anode compartment of the cell until all, or substantially all, of the $N_2O_4$ in the anolyte is converted to $N_2O_5$.

In continuous operation the rate at which anolyte is passed into and out of the cell will be determined by, amongst other things, the current/voltage applied, the concentration of $N_2O_4$ in the anolyte, the % conversion of $N_2O_4$ to $N_2O_5$ required, the cell geometry and the type of cell membrane employed.

In the semi-continuous operation, the rate of anolyte entry to and exit from the cell is determined by, amongst other things, the need to keep the anolyte temperature within certain limits and the rate of $N_2O_4$ loss from the catholyte.

When $N_2O_4$ is oxidised electrochemically, the overall cell reactions are as follows:

Anode Reaction $N_2O_4 + 2HNO \rightarrow 2N_2O_5 + 2H^+ + 2e$

Cathode Reaction
$2HNO_3 + 2H^{-3} - 2e \rightarrow N_2O_4 + 2H_2O$

Overall Cell Reaction $4HNO_3 \rightarrow 2N_2O_5 + 2H_2O$

At the anode, $N_2O_4$ is oxidised in the presence of $HNO_3$ to $N_2O_5$. Whether the process is continuous or semi-continuous the initial concentration of $N_2O_4$ in $HNO_3$ should be high enough to allow the use, at least initially, of a high cell current whilst maintaining good power efficiency. Preferably the wt % of $N_2O_4$ in $HNO_3$ is between 5 and saturation, especially between 10 and 20. During continuous operation the concentration of $N_2O_4$ in the anolyte passed into the cell should remain within these preferred limits. During semi-continuous operation, however, the $N_2O_4$ concentration in the anolyte may eventually fall to, or close to, zero.

Previously it was believed that substantially anhydrous $HNO_3$ was required for the electrochemical oxidation of $N_2O_4$. The present inventors, however, have found that it is not absolutely necessary to use anhydrous acid, although $HNO_3$ of at least 98% concentration is preferred.

In fact the anolyte (and the catholyte) may contain up to about 12% (by weight) of water. There is a disadvantage to the use of non-anhydrous $HNO_3$ in the present process, however, which is that in the first stages of the electrolysis any $N_2O_5$ formed in the anolyte immediately combines with the water to form $HNO_3$. The use of non-anhydrous $HNO_3$ therefore renders the overall process less efficient.

At the cathode, $HNO_3$ is reduced to $N_2O_4$. Therefore, during the electrolysis, the $N_2O_4$ concentration will build up in the catholyte, a result of this reduction (of $HNO_3$) and of the migration of $N_2O_4$ from the anolyte. Preferably, the concentration of $H_2O_4$ in the catholyte is maintained within the range 5 wt % to saturation, i.e. around 33% (by weight), especially between 10 and 20%. The maintainance of these $N_2O_4$ levels in the catholyte allows the cell to be run using a high current and a low voltage (thereby increasng power efficiency). Furthermore, by maintaining these preferred levels of $N_2O_4$ in the catholyte, the $N_2O_4$ *concentration gradient across the cell membrane is lowered, this, in turn, discourages the loss of* $N_2O_4$ from the anolyte by membrane transport.

As has been noted above, $N_2O_4$ is formed in the catholyte during the course of the present process. It follows that in order to maintain the $N_2O_4$ concentration in the catholyte between the above preferred limits, it may be necessary to remove $N_2O_4$ from the catholyte as the electrolysis progresses. This may most readily be done by distilling $N_2O_4$ from the catholyte. In one particularly preferred embodiment of the present process, when operated in a continuous mode, the $N_2O_4$ removed from the catholyte is added to the anolyte.

It is possible to operate the process of the present invention with $N_2O_4$ separating as a distinct layer above the catholyte, from whence it may be distilled from the cathode compartment into the anolyte simple by maintaining the cathode compartment at a higher temperature than the anode compartment, so as to maintain a higher vapour pressure of $N_2O_4$ in the cathode compartment.

The present process is preferably performed whilst maintaining the temperature of the cell (and of the catholyte and anolyte) between 5° and 25° C., especially 10° to 15° C. It may be necessary to cool the cell and/or the catholyte and anolyte in order to maintain the temperature between these limits. This may be done, for example by the use of water cooling jackets.

The cell current density employed during the present electrolysis is preferably between 50 and 1500 Amps.$m^{-2}$. The optimum cell current for a given electrolysis in accordance with this invention will be determined primarily by the surface area of the anode and cathode and by the $N_2O_4$ concentration in the anolyte and catholyte. Generally the, higher the $N_2O_4$ concentration in the anolyte and catholyte, the higher the cell current that may be maintained at a given power efficiency.

The cell voltage during the present electrolysis is preferably between +1.0 and +20 Volts. The actual voltage required being determined primarily by the cell current to be passed and the nature of the cell membrane. Although it is not necessary to measure the anode potential during the course of the present process the present inventors have noted that the most efficient conversion of $N_2O_4$ to $N_2O_5$ by the process of the present invention takes place when the cell voltage employed leads to an anode potential VS SCE between +1.0 and 2.5 V.

The electrochemical cell for performing the process of the invention which has an anode plate situated in an anode compartment and a cathode plate situated in a cathode compartment, the anode plate and the cathode plate being in a substantially parallel relationship. The cell has an inlet and an outlet to both its anode and cathode compartments, the position of which allows electrolyte to flow continuously into and out of the compartments past the respective electrodes.

The parallel plate electrode geometry of the cell is designed to promote a uniform potential distribution throughout the cell.

The cell design also facilitates the variation of the interelectrode gap. Generally a narrow gap between the electrodes is preferred, since this minimises the cell volume and the potential drop in the electrolyte.

The anode and the cathode are each formed from a conductive material capable of resisting the corrosive environment. For example, the anode may comprise Pt, or Nb or Nb/Ta 40:60 alloy with a catalytic platinum coating. The cathode, on the other hand, may comprise Pt, stainless steel, Nb or Nb/Ta 40:60 alloy.

The anode and cathode compartments are preferably separated by a cell membrane which allows ionic transfer between the anolyte and catholyte by which prevents mixing of the anolyte and catholyte and consequent dilution of the $N_2O_5$-rich anolyte.

The cell membrane must have sufficient chemical stability and mechanical strength to withstand the hostile environment found in the present cell during the present process. Suitable membranes must also have a low electrical resistance, in order to minimize the overall cell resistance and hence power consumption. Membranes comprising perfluorinated hydrocarbons generally meet these requirements. In one embodiment of the present cell, the cell membrane is a perfluorinate hydrocarbon non-ion exchange membrane. In another, and preferred, embodiment the cell membrane is a perfluorinated cationic ion exchange membrane, especially of the type sold under the Trade Mark Nafion, preferably Nafion423. The cell membrane which is preferably in a parallel relationship to the anode and cathode, is also properly supported between these two electrodes. Since even the strongest and most stable of membranes will eventually be affected by the hostile environment in which they have to operate during the course of the present process, the membrane state and integrity should preferably be examined from time to time, especially by measuring the potential drop across the membrane.

The design of the present electrochemical cell facilitates the scale up of the present process to an industrial level. Furthermore, the flow through design also allows the extension of the anolyte inventory and the refreshment of the cell electrolyte (especially with $N_2O_4$). The working surface of the anode and the cathode can vary, depending on the scale of the present process. However, the ratio of the area of the anode to the volume of the anode compartment is preferably kept within the range 0.1 and 10 $cm^2ml^{-1}$.

In a preferred embodiment of the process of the present invention two or more electrochemical cells as described above are connected in series so as to operate in a multi-stage process with each stage working under optimum conditions for its specific use, i.e. the first stage is operated to produce maximum quantities of $N_2O_5$ whereas the final stage is operated to reduce the $N_2O_4$ level to a minimum level, preferably less than 3 wt %.

In such a multi-stage process the second and further stages if present act as recirculating units fed from the preceding stage. The electrolysed anolyte from each stage, in which $N_2O_5$ concentration has been raised to the optimum working level for the next stage, is passed to the anode compartment, or compartments if a parallel battery of cells is used, of the next stage, where $N_2O_5$ concentration can be further increased and/or $N_2O_4$ concentration can be decreased. Each stage may thus be operated under steady state conditions with the nitric acid flowing through the complete battery with the concentration of $N_2O_5$ increasing and the concentration of $N_2O_4$ decreasing in the anolyte at each stage. $N_2O_4$ may be distilled from the catholyte of all stages back to the starting anolyte.

To maintain operation of the multi-stage process as a steady state with a constant composition in each stage, control of the process at each stage may be achieved by monitering the physical properties of its output stream and using this to control the cell potential or current, whichever is more convenient.

The product stream flowing through the battery is a three component stream containing nitric acid, $N_2O_5$ and $N_2O_4$. In a preferred method the first stage is operated with the anolyte in saturated equilibrium with $N_2O_4$, about 33 wt % $N_2O_4$, i.e. the anolyte reservoir is a temperature controlled two-phase system. This allows temperature to control $N_2O_4$ level, a simple technique, and eliminates the need for accurate dosing of $N_2O_4$ into the stream. Monitoring the density of the anolyte stream of the first stage thus provides an indication of the $N_2O_5$ level and can be used to control the current to the cell battery via a feedback circuit in order to maintain $N_2O_5$ levels to the required degree.

In the simplest multi-stage process, where there are only two stages, the second (final) stage would be operating to reduce the $N_2O_4$ levels to a suitably low level. levels below 3 wt % being attainable. Thus the output anolyte stream from this stage is monitored to determine $N_2O_4$ levels by for example UV absorbance at 420 nm or density.

Cells according to the invention may be connected in parallel in a battery of cells which may be used either in a single stage process or in a series of such batteries in a multi-stage process. Thus use of such a parallel battery advantageously increases the throughput of the electrolytic process.

The electrolytic process and electrochemical cell of the present invention will now be described by way of example only, with particular reference to the Figures in which, FIG. 1 represents a plan view of the PTFE back plate, which acts as a support for either an anode or a cathode.

FIG. 4 represents a perspective view of the first stage of a cell assembly,

FIG. 5 represents a perspective view of the second stage of a cell assembly,

CELL DESIGN

Figure 1:
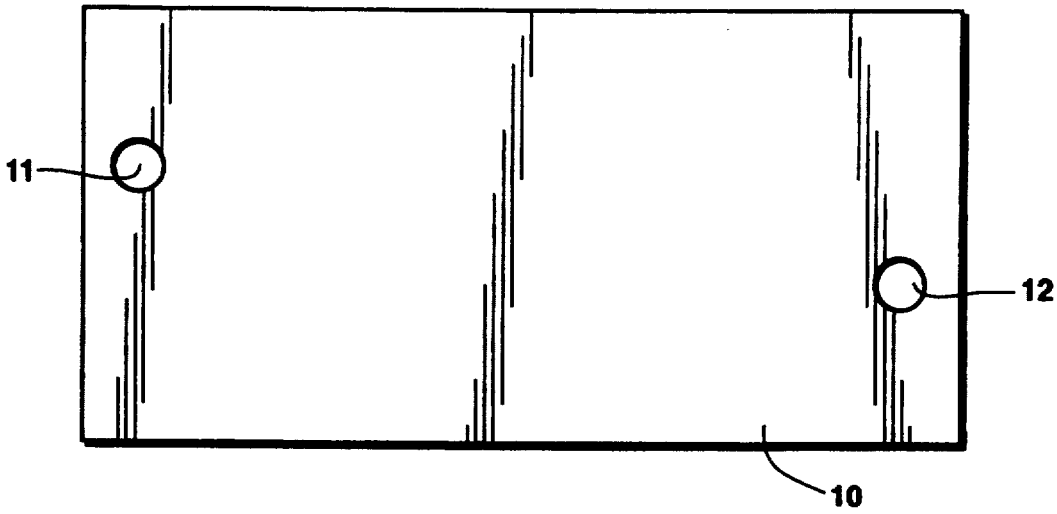

A parallel plate and frame cell design was employed. FIG. 1 illustrates a PTFE back plate (10), which acts, in an assembled cell, as a support for either an anode or a cathode. The plate (10), has an inlet (11) and an outlet (12) port for an electrolytic solution. The cell was designed with the possibility of a scale up to an industrial plant in mind. Thus the off centre position of the electrolyte inlet (11) and outlet (12) enables the use of the plate (10) in either an anode or a cathode compartment. Furthermore, if the process is to be scaled up, a simple filter press configuration can be made and stacks of cells connected in parallel. In such a filter press scaled up version, the anolyte and catholyte would circulate through the channels formed by the staggered inlet and outlet ports.

Figure 2:
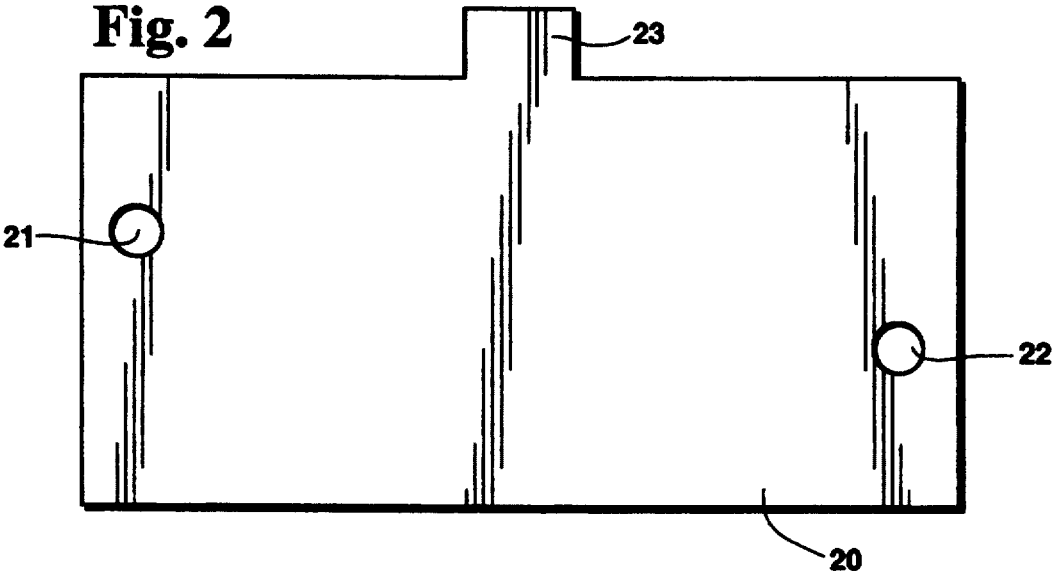
FIG. 2 represents a plan view of a platinised Ti anode.

The same concept of off-centre inlet and outlet is also found in the cell electrodes. As illustrated in FIG. 2, a cathode (20), has an inlet (21) and an outlet (22). Electrical contact with the Nb cathode, is made through the protruding lip (230).

Figure 3:
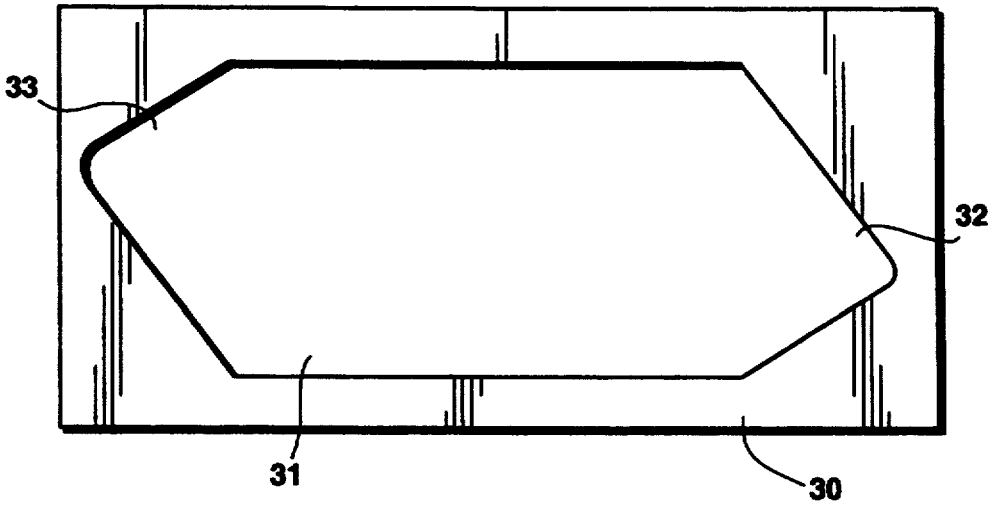
FIG. 3 represents a plan view of a PTFE frame separator, for separating either an anode or a cathode from a cell membrane.

PTFE frame separators (30), of the type illustrated in FIG. 3 may form the walls of both the anode and the cathode compartments. The hollow part of the frame (31) has triangular ends (32, 33) which are so shaped as to leave the inlet and outlet of the anode compartment fee, whilst blocking the outlet and inlet of the cathode compartment, or vice versa. In the event of a filter press scale up, the electolyte would circulate through holes specially drilled in the frame.

FIG. 4 illustrates the first stage of cell assembly, being a cathode compartment. The cathode compartment consists of a PTFE back plate (not shown), on which rests a niobium cathode (40), upon which rests a frame separator 41. Within the hollow part of the frame separator a PTFE coarse grid (42) rests on the cathode (40). The whole assembly rests upon an aluminum back plate (43) having a thickness of 10 mm.

The coarse grid (42) is used to support a cell membrane (not shown) across the cell gap. A Luggin probe (44) is inserted close to the cell centre, the purpose of which is to measure electrode potential during electrolysis.

FIG. 5 illustrates the second stage of cell assembly, in this case an anode compartment, resting upon the cathode compartment illustrated in FIG. 4 (not shown). The assembly consists of a Nafion (Trade Mark) cell membrane (50) resting directly upon the frame separator (41) (not shown) of the anode compartment, a frame separator (51) resting upon the membrane (50) and a PTFE coarse grid (52) also resting upon the membrane (50) and lying within the hollow part of the frame separator (51). A second Luggin probe (53) is inserted close to the cell centre. The frame separator (51) is placed in a staggered position with respect to the frame separator (41) of the cathode compartment (see FIG.4). As mentioned before, such a staggered relationship allows a simple filter press scale up.

Figure 6:
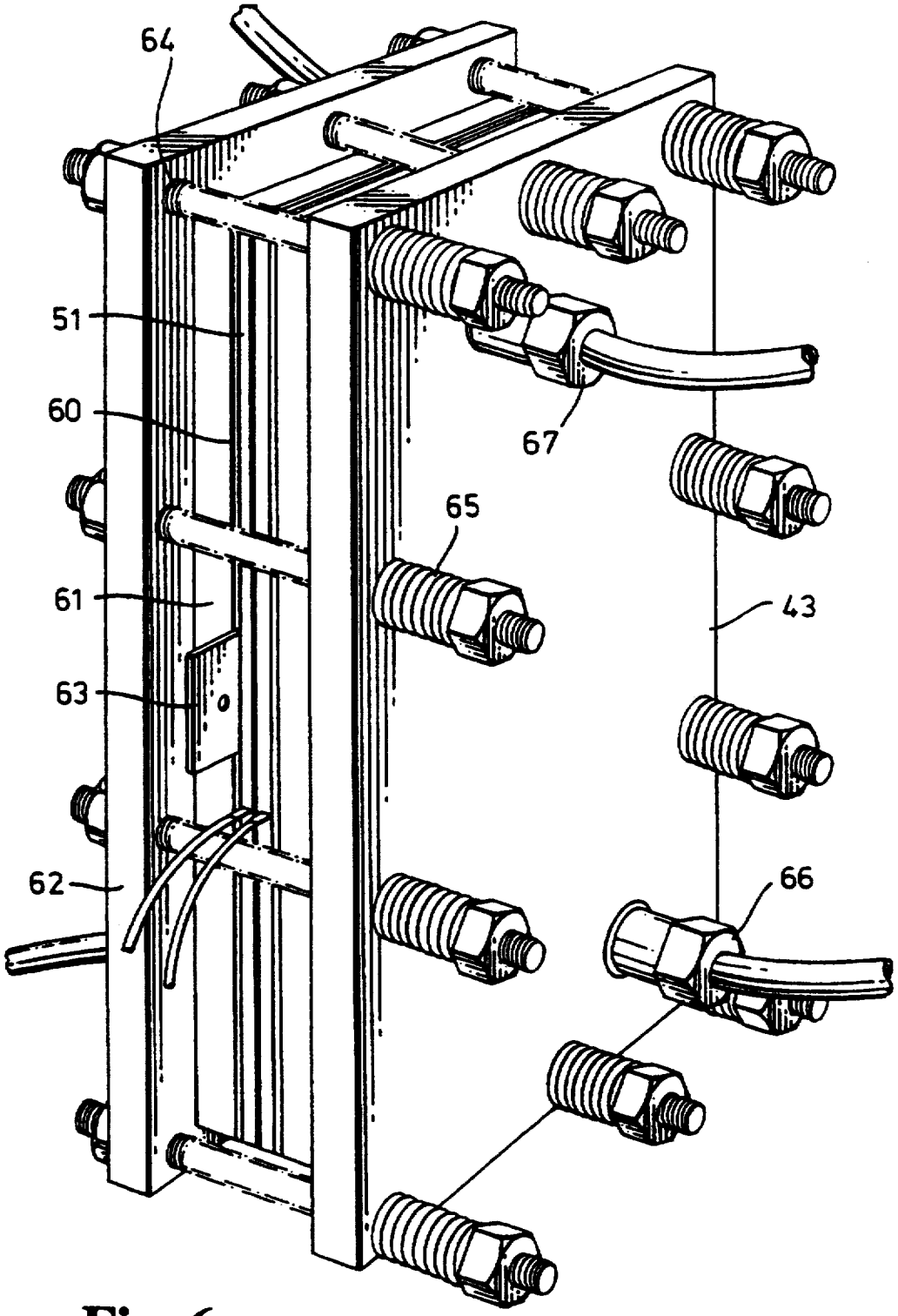
FIG. 6 represents a perspective view of an assembled cell.

The cell is completed, as shown in FIG. 6, by placing a paltinisied niobium anode (60) on top of the anode separator frame (51), followed by a PTFE back plate (61) on top of the anode (60) and an aluminium plate (62) on top of the back plate (61). In this final form the electrical connection (63) for the anode (60) is on the opposite side of the cell to the electrical connection (not shown) for the cathode (40). A PTFE emulsion was used as a sealant for all parts of the cell and the whole sandwich structure was compressed and held firm by nine tie rods (64) and springs (65). The aluminium plate (43) to the cathode compartment has an inlet (66) and an outlet (67). Similarly the aluminium plate (62) to the anode compartment has an inlet and an outlet (not shown).

Figure 7:
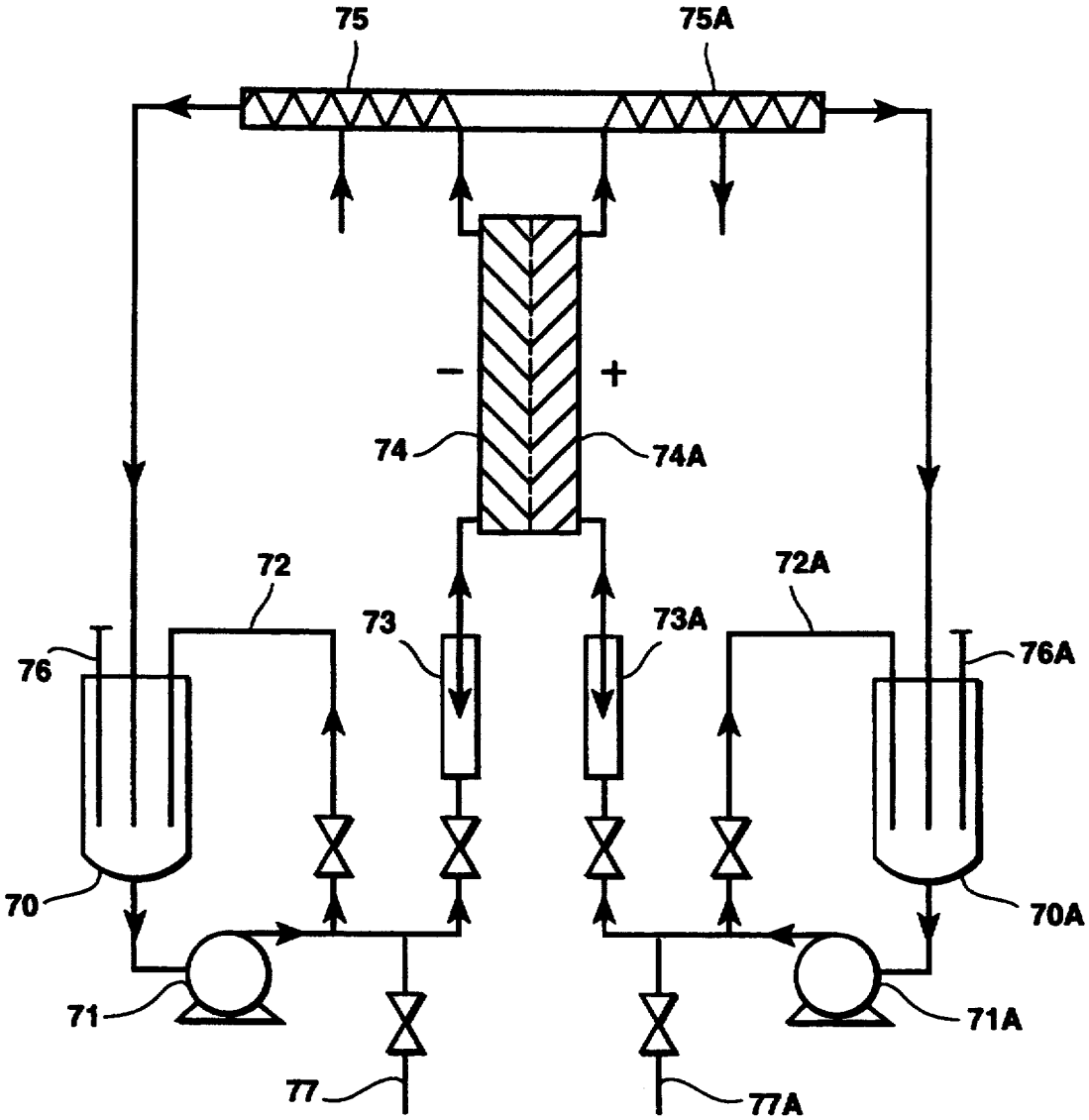
FIG. 7 represents a circuit diagram of an electrolysis circulation system.

A circulation system, for the cell illustrated in FIG. 6, is illustrated in FIG. 7. The anolyte and catholyte are placed in 500 ml reservoirs (70, 70A) which act as reservoirs. The electrolyte is circulated, by means of diaphragm pumps (71, 71A), through both by passes (72, 72A) to the reservoirs (70, 70A), and Platon (Trade Mark) flow meters (73, 73A) to each of the compartments (74, 74A) of the cell respectively. The electrolyte is returned to the reservoirs (70, 70A) through heat exchangers (75, 75A) (two tubes in one shell) respectively. One tube (75) of the heat exchanger is used for the anolyte circuit and the other (75A) for the catholyte circuit. Cooling units (not shown) supplied water at a temperature of 1°-3° C. to the heat exchangers (75, 75A). The temperature of the cooling water is monitered with a thermometer (not shown) in the cooling lines. The temperature of the anolyte and catholyte is measured with thermometers (76, 76A) incorporated into the corresponding reservoirs (70, 70A) respectively. Electrolyt entered each compartment of the cell from the bottom via a PTFE tube (no shown). Samples of electrolyte can be taken at the points (77, 77A). All the joints in the circuit were sealed with a PTFE emulsion before tightening.

MODE OF OPERATION a. Cleaning

The two compartments were rinsed with a 200 mls of 100% $HNO_3$ prior to an experiment, by circulating the acid for 10 minutes. After this period, the reservoirs were drained.

b. Loading one hour prior to the experiment, the $N_2O_4$ cylinder was placed in a container with crushed ice to ensure that it was present in the liquid state for measuring purposes. The correct amount of $HNO_3$ was loaded into both reservoirs and circulated with the cooling system on. (This is required to a avoid unnecessary evaporation on addition of $N_2O_4$). With the system employed, the temperature was ca. 10° C., although the cooling liquid had a temperature of ca. 1° C. The heating was due to the $HNO_3$ pumps.

$N_2O_4$ was poured into a measuring cylinder kept in ice, by simply opening the cylinder valve, inverting the cylinder and gently shaking it. The $N_2O_4$ was added slowly to the anolyte reservoir through a glass funnel, but some evaporation was always observed although circulation and cooling was kept on during the addition. For this reason, the analytical concentration measured for the sample before electrolysis, was taken as the true initial value.

c. Electrolysis

After mixing the anolyte, voltage was applied to the cell and was manually controlled during the course of the experiment to give the required current. Several samples from both compartments were taken during the run at different times, and both the potential drop across the cell and the temperature of the electrolytes were monitored. During the course of the electrolysis, the colour of the catholyte changed from pale yellow to reddish-brown, whereas the reverse effect was observed with the anolyte. No gas evolution could be observed during the course of electrolysis, but towards the end of the experiment, when the characteristic colour of $N_2O_4$ had disappeared from the anolyte, some gas evolution could be seen in the from of small bubbles trapped in the anolyte stream.

d. Shutting down procedure

The current was first switched off, then the pumps and cooling system. The two cell compartments were then drained.

e. Safety precautions

Both the polycarbonate swing doors of the cell box and the fume cupboard shield were kept closed during an experiment. For taking samples, the operator always used rubber gloves and full face splash shields. The system was always used with at least two operators present.

ANALYTICAL METHODS

The concentration of $N_2O_4$ present in the $HNO_3$ solution was determined by titration of the nitrate ion formed by the hydrolysis reaction of $N_2O_4$:

$$N_2O_4 + H_2O \rightarrow NO_3^- + NO_2^- + 2H^+$$

The nitrite formed was oxidised to nitrate with $Ce^{4+}$

A. DETERMINATION OF NITRITE

Method

A known volume (typically 0.25 $cm^3$) of sample was added to a known excess volume (typically 50 $cm^3$) of standard cerium (IV) sulphate solution (nominally 0.050M, aq) whereby nitrate was oxidised to nitrate according to the following reaction $$2Ce^{IV} + NO_2^- + H_2O \rightarrow 2Ce^{III} + NO_3^- + 2H^+$$

The excess Cerium (IV) was then determined by titration with standar Iron (II) Ammonium Sulphate solution (0.100M, aq) using Ferroin indicator (blue to red at end-point).

$$Fe^{II}(aq) + Ce^{IV}(aq) \rightarrow Fe^{III}(aq) + Ce^{III}(aq)$$

B. DETERMINATION OF TOTAL ACIDITY

Method

A known volume (typically 0.2 $cm^3$) of sample was added to a known volume (typically 30 $cm^3$) of standard sodium hydroxide solution (0.2M, aq). The excess of hydroxyl ions was determined by titration with standard sulphuric acid (0.1M, aq) using phenolphthalein indicator (mauve to colourless at end-point). The acid titration was not very reliable due to uncertainties in the volume delivered and the reaction was followed by the decrease in $N_2O_4$ concentration as electrolysis proceeded.

EXAMPLES 1 TO 6

Different runs have been performed with the system using different current densities and concentrations of $N_2O_4$. The results for the examples are shown in Tables 1 to 6.

TABLE 1

Run 1.
Conditions: 200 ml $HNO_3$ + 22 mls $N_2O_4$.
T = 10° C., Current = 5 Amps.

| | Time Mins | $N_2O_4$ conc mol/lt | V Volts | Charged Passed Coul. |
|---|---|---|---|---|
| Anolyte | 0 | 1.5 (estimated) | 8.8 | 0 |
| | 5 | — | 9.4 | $1.5 \times 10^3$ |
| | 15 | — | 8.1 | $4.5 \times 10^3$ |
| | 22 | — | 7.1 | $6.6 \times 10^3$ |
| | 33 | — | 6.5 | $9.9 \times 10^3$ |
| | 90 | — | 6.4 | $2.7 \times 10^4$ |
| | 95 | — | 6.8 | $2.9 \times 10^4$ |
| | 100 | 0.01 | 7.0 | $3.0 \times 10^4$ |

Final volume = 195 mls

The final catholyte concentration was of 1.4M and the final volume was 225 mls

TABLE 2

Run 2
Conditions: $N_2O_4$ and total acid content of anolyte and catholyte.
Current = 5 A. Temperature = 10° C.

| | Time Mins | Voltage V | $N_2O_4$ conc. mol/lt | Total acid ($NO_3^-$ + $NO_2^-$) conc. mol/lt | Charge Passed C | Volume ml |
|---|---|---|---|---|---|---|
| anolyte | 0 | 3.8 | 1.23 | 24.7 | — | 220 |
| | 20 | 4.2 | 0.95 | 24.5 | $6 \times 10^3$ | |
| | 40 | 5.0 | 0.605 | 24.40 | $12 \times 10^3$ | |
| | 60 | 5.1 | 0.26 | 24.25 | $18 \times 10^3$ | |
| | 80 | 5.3 | 0.03 | 24.15 | $24 \times 10^3$ | 155 |
| catholyte | 0 | | 0.035 | 24.25 | — | 200 |
| | 20 | | 0.385 | — | $6 \times 10^3$ | |
| | 40 | | 0.765 | — | $12 \times 10^3$ | |
| | 60 | | 1.04 | — | $18 \times 10^3$ | |
| | 80 | | 1.28 | 24.5 | $24 \times 10^3$ | 200 |

TABLE 3

Run 3.
Conditions: $N_2O_4$ and total acid content of anolyte and catholyte.
Current = 10 A. Temperature 11–14° C.

| | Time Mins | Voltage V | $N_2O_4$ conc. mol/lt | Total acid ($NO_3^-$ + $NO_2^-$) conc. mol/lt | Charge Passed C | Volume ml |
|---|---|---|---|---|---|---|
| anolyte | 0 | 4.5 | 1.55* | — | — | 450 |
| | 10 | 4.1 | 1.385 | 25.15 | $6 \times 10^3$ | |
| | 30 | 3.4 | 1.125 | 25.0 | $18 \times 10^3$ | |
| | 51 | 3.4 | 0.785 | 24.9 | $30.6 \times 10^3$ | |
| | 75 | 3.6 | 0.39 | 24.9 | $45 \times 10^3$ | |
| | 97 | 4.0 | 0.09 | 25.15 | $58.2 \times 10^3$ | 325 |
| catholyte | 0 | | 0.02 | — | — | 362 |
| | 10 | | 0.28 | 24.45 | $6 \times 10^3$ | |
| | 30 | | 0.70 | — | $18 \times 10^3$ | |
| | 51 | | 1.035 | — | $30.6 \times 10^3$ | |
| | 75 | | 1.45 | — | $45 \times 10^3$ | |
| | 97 | | 1.63 | 25.25 | $58.2 \times 10^3$ | 375 |

*Calculated by extrapolation.

TABLE 4

Run 4.
Conditions: $N_2O_4$ and total acid content of anolyte and catholyte.
No voltage was applied. Temperature = 10° C.

| | Time Mins | $N_2O_4$ conc. mol/lt | Total acid ($NO_3^-$ – $NO_2^-$) conc. mol/lt | Charge Passed C | Volume ml |
|---|---|---|---|---|---|
| anolyte | 0 | — | — | — | 450 |
| | 11 | 1.56 | 24.10 | — | |
| | 54 | 1.54 | — | — | |
| | 90 | 1.50 | 24.15 | — | 410 |
| catholyte | 0 | — | — | — | 400 |
| | 11 | 0.03 | — | — | |
| | 54 | 0.06 | 24.25 | — | |
| | 90 | 0.07 | — | — | |

The purpose of this run was to determine the leakage of $N_2O_4$ from the anode to the cathode in the absence of impressed current.

TABLE 5

Run. 5.
Conditions: $N_2O_4$ and total acid content of anolyte and catholyte.
Current 13.5 A to 11.5 A. Temperature = 14° C.

| | Time Mins | Voltage V | $N_2O_4$ conc. mol/lt | Total acid ($NO_3^-$ + $NO_2^-$) conc. mol/lt | Charge Passed C | Volume ml |
|---|---|---|---|---|---|---|
| anolyte | 0 | 5.48 | 2.67 | 24.55 | — | 500 |
| | 30 | 4.36 | 2.48 | — | $25.2 \times 10^3$ | |
| | 60 | 4.11 | 1.89 | 25.25 | $49.5 \times 10^3$ | |
| | 90 | 4.17 | 1.26 | — | $73.3 \times 10^3$ | |
| | 135 | 4.37 | 0.15 | 24.65 | $106 \times 10^3$ | 290 |
| catholyte | 0 | | 0.025 | 24.55 | — | 400 |
| | 30 | | 0.81 | — | $25.2 \times 10^3$ | 415 |
| | 60 | | 1.49 | 24.65 | $49.5 \times 10^3$ | 430 |
| | 90 | | 1.91 | — | $73.3 \times 10^3$ | 450 |

TABLE 5-continued

Run. 5.
Conditions: $N_2O_4$ and total acid content of anolyte and catholyte.
Current 13.5 A to 11.5 A. Temperature = 14° C.

| Time Mins | Voltage V | $N_2O_4$ conc. mol/lt | Total acid ($NO_3^-$ + $NO_2^-$) conc. mol/lt | Charge Passed C | Volume ml |
|---|---|---|---|---|---|
| 135 | | 2.5 | 24.55 | $106 \times 10^3$ | 480 |

TABLE 6

Run 6.
Conditions: $N_2O_4$ and total acid content of anolyte and catholyte.
Current = 25 A. Temperature = 14° C.

| | Time Mins | Voltage V | $N_2O_4$ conc. mol/lt | Total acid ($NO_3^-$ + $NO_2^-$) conc. mol/lt | Charge Passed C | Volume ml |
|---|---|---|---|---|---|---|
| anolyte | 0 | 5.5 | 2.86 | 24.5 | — | 500 |
| | 30 | 3.6 | 2.26 | 24.95 | $45 \times 10^3$ | |
| | 65 | 3.4 | 1.35 | — | $97.5 \times 10^3$ | |
| | 102 | 3.8 | 0.425 | 25.15 | $153 \times 10^3$ | 325 |
| catholyte | 0 | | 0.025 | 24.4 | — | 400 |
| | 30 | | 1.15 | 24.55 | $45 \times 10^3$ | |
| | 65 | | — | — | $97.5 \times 10^3$ | |
| | 102 | | — | — | $153 \times 10^3$ | |

Figure 8:
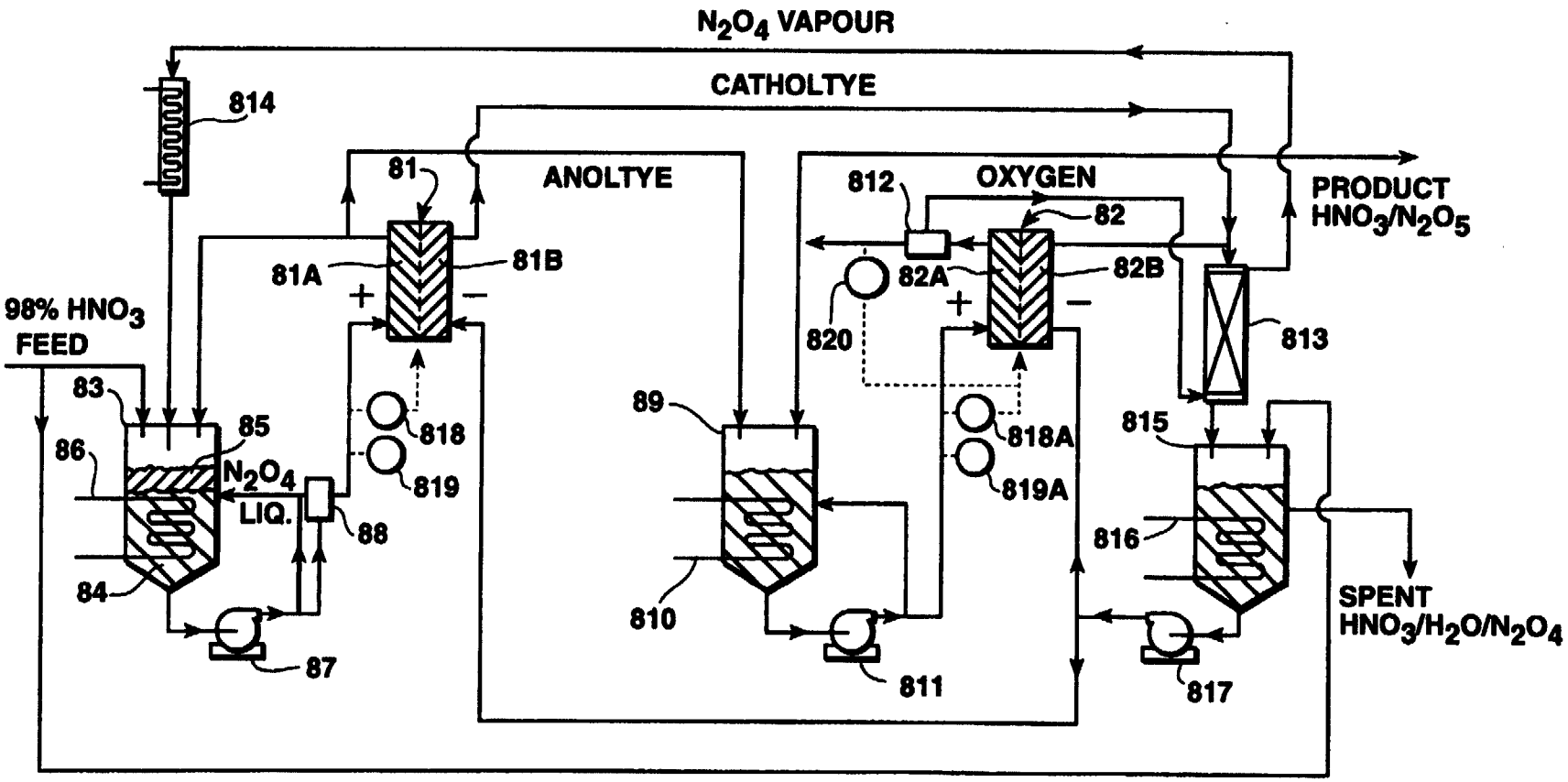
FIG. 8 represents a circuit diagram of a multi-stage electrolysis system.

A circuit diagram of a multi-stage system using a series of two batteries (81, 82) each of four cells the type illustrated in FIG. 6 connected in parallel, is shown in FIG. 8, which is to some extent simplified by the omission of valves.

The anolyte for the first stage battery (81) is stored in a reservoir (83) and comprises a saturated solution of $N_2O_4$ in $HNO_3$ (84) below on upper layer of liquid $N_2O_4$ (85). The anolyte is cooled by a cooling coil (86) through which flows water at 1°-3° C. The anolyte is circulated by means of a centrifugal pump (87), through an $N_2O_4$ separator (88) which returns free liquid $N_2O_4$ to the reservoir (83) and transfers the remaining anolyte, to the anolyte compartments (81A) of the battery (81). The battery (81) is operated under conditions which produce maximum levels of $N_2O_5$.

The electrolysed anolyte from the anolyte compartment (81A) is passed to a second reservoir (89), also cooled by a cooling coil (810), and is from there circulated through the anolyte compartments (82A) of the second battery (82) by a second centrifugal pump (811). The battery (82) is operated so as to reduce the $N_2O_4$ concentration in the anolyte to a minimal level. The output, rich in $N_2O_5$, is passed through an oxygen separator (812) which removes the oxygen which is sometimes formed on operation of the cell at low $N_2O_4$ concentrations, before being collected as the final product.

The catholyte from each cathode compartment (81B, 82B) is passed to an $N_2)_4$ extractor (813) from whence $N_2O_4$ vapour is distilled out, condensed by a condensor (814) and returned to the first stage anolyte reservoir (83). Residual liquid catholyte from which excess $N_2O_4$ has been distilled is collected in a third reservoir (815) cooled by a cooling coil (816), and recirculated to the cathode compartments (81B), (82B) by a centrifugal pump (817). Excess spent catholyte is drained off.

The operating conditions of the two batteries of cells are controlled by monitoring the density of the anolyte in density indicators (818, 818A) and flowmeters (819, 819A). The $N_2O_4$ (impurity) concentration in the final product is measured by a UV analyser (820).

We claim:

1. A method for the electrochemical generation of dinitrogen pentoxide comprising:

providing an electrochemical cell having an anode situated in an anode compartment and a cathode situated in a cathode compartment, the anode and cathode comprising plates configured in a substantially parallel relationship;

continuously passing anolyte comprising a first solution of dinitrogen tetroxide in nitric acid through the anode compartment;

continuously passing catholyte comprising a second solution of dinitrogen tetroxide in nitric acid through the cathode compartment; [and] *between the anolyte and catholyte providing a membrane between the anode and cathode compartments for allowing the transfer of ions; and* while the anolyte and catholyte are passing through the anode and the cathode compartments respectively, applying a potential difference between the anode and cathode so that an electrical current passes through the cell and dinitrogen pentoxide forms in the anode compartment;

repeatedly passing the anolyte through the anode compartment and maintaining at a constant level either the potential difference between the anode and the cathode or the electrical current passing through the cell.

2. A method as claimed in claim 1, including constantly replenishing the anolyte with dinitrogen tetroxide, in order to maintain the required concentration of dinitrogen tetroxide in the anolyte.

3. A method as claimed in claim 1, wherein the starting concentration of dinitrogen tetroxide in the anolyte is between 5 wt % and saturation.

4. A method as claimed in claim 3, wherein the starting concentration of dinitrogen tetroxide in the anolyte is between 10 wt % and 20 wt %.

5. A method as claimed in claim 1, including maintaining the concentration of dinitrogen tetroxide in the catholyte between 5 wt % and saturation.

6. A method as claimed in claim 5, including maintaining the concentration of dinitrogen tetroxide in the catholyte between 10 wt % and 20 wt %.

7. A method as claimed in claim 1, including maintaining the temperature of the catholyte and the anolyte between 5° C. and 25° C.

8. A method as claimed in claim 1, including maintaining the cell current density between the anode and the cathode plates between 50 Amps.$m^{-2}$ and 1500 Amps.$a^{-2}$.

9. A method as claimed in claim 1, including maintaining the cell voltage between 1 volt and 20 volts.

10. A method as claimed in claim 9, including maintaining the anode potential vs SCE between +1.0 volt and +2.5 volts.

11. A method as claimed in claim 1, including passing the anolyte through two or more of the electrochemical cells connected in series so as to operate in a multi-stage process, such that the anolyte passes repeatedly through each cell as it progresses through said cells in turn.

12. A method as claimed in claim 11, including operating the last of said cells connected in series so as to reduce the dinitrogen tetroxide concentration in the anolyte to less than 3 wt %.

13. A method as claimed in claim 11, including operating the multi-stage process in a steady state with a constant composition at each stage.

14. A method as claimed in claim 11, including continuously monitoring the density of the anolyte with sensors in at least one of the said stages to control the operating conditions of the process.

* * * * *